(12) United States Patent
Kaneko et al.

(10) Patent No.: US 11,444,501 B2
(45) Date of Patent: Sep. 13, 2022

(54) STATOR HAVING AN INSULATING FILM FOR A COIL

(71) Applicant: HONDA MOTOR CO., LTD., Tokyo (JP)

(72) Inventors: Ryotaro Kaneko, Wako (JP); Tadao Nishiyama, Wako (JP); Keisuke Azusawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 16/572,773

(22) Filed: Sep. 17, 2019

(65) Prior Publication Data

US 2020/0091792 A1     Mar. 19, 2020

(30) Foreign Application Priority Data

Sep. 19, 2018   (JP) .............................. JP2018-175009

(51) Int. Cl.
```
H02K 3/40       (2006.01)
H02K 15/10      (2006.01)
H02K 3/30       (2006.01)
```
(52) U.S. Cl.
CPC .................. *H02K 3/40* (2013.01); *H02K 3/30* (2013.01); *H02K 15/105* (2013.01)

(58) Field of Classification Search
CPC ........... H02K 3/30; H02K 3/34; H02K 3/345; H02K 3/38; H02K 3/40; H02K 15/105
USPC ......................................... 310/208, 214, 215
See application file for complete search history.

(56) References Cited

U.S. PATENT DOCUMENTS

| | | | |
|---|---|---|---|
| 4,616,407 A | 10/1986 | Tamaki et al. | |
| 4,723,083 A | 2/1988 | Elton | |
| 10,763,730 B2 * | 9/2020 | Hashimoto | .......... H02K 15/105 |
| 2002/0089250 A1 | 7/2002 | Naka et al. | |
| 2004/0145257 A1 | 7/2004 | Oohashi | |
| 2013/0049514 A1 * | 2/2013 | Ikuta | ........................ H02K 3/38 |
| | | | 310/195 |
| 2014/0319942 A1 * | 10/2014 | Nakayama | .......... H02K 15/0435 |
| | | | 310/71 |
| 2017/0200554 A1 * | 7/2017 | Kudo | ..................... H01F 27/255 |
| 2020/0091790 A1 * | 3/2020 | Kaneko | .................. H02K 3/345 |

(Continued)

FOREIGN PATENT DOCUMENTS

| | | |
|---|---|---|
| CN | 101383544 | 3/2009 |
| CN | 100490276 | 5/2009 |
| CN | 102035313 | 4/2011 |

(Continued)

OTHER PUBLICATIONS

Kikuchi et al., English Machine Translation of JP 2012-222857 (Year: 2012).*

(Continued)

*Primary Examiner* — Rashad H Johnson

(74) *Attorney, Agent, or Firm* — Amin, Turocy & Watson, LLP

(57) ABSTRACT

A stator includes a stator core, and a coil mounted on the stator core and having an insulating film, at least a part of the insulating film being coated with a protective paint, wherein the insulating film has a vacancy, and the vacancy is formed by a hollow capsule. In addition, the protective paint has a powder, and an internal form of the vacancy is smaller than an external form of the powder.

3 Claims, 3 Drawing Sheets

(56) References Cited

U.S. PATENT DOCUMENTS

2020/0127521 A1* 4/2020 Azusawa ............... H02K 3/30
2020/0161915 A1* 5/2020 Kaneko ................. H02K 3/30

FOREIGN PATENT DOCUMENTS

| | | |
|---|---|---|
| CN | 103733481 | 4/2014 |
| CN | 106329857 | 1/2017 |
| EP | 1079504 | 2/2001 |
| EP | 1128526 | 8/2001 |
| JP | 31-062348 | 3/1986 |
| JP | 2003-260407 | 9/2003 |
| JP | 2012-222857 | 11/2012 |
| JP | 2015-050856 | 3/2015 |
| JP | 2017-163666 | 9/2017 |
| JP | 2018-007300 | 1/2018 |
| JP | 2018-067516 | 4/2018 |
| JP | 2018-117402 | 7/2018 |

OTHER PUBLICATIONS

Furuya et al., English Machine Translation of JP 2018-067516 (Year: 2018).*

Chinese Office Action for Chinese Patent Application No. 201910878744.6 dated May 6, 2021.

Japanese Notice of Allowance for Japanese Patent Application No. 2018-175009 dated Jun. 30, 2020.

Japanese Office Action for Japanese Patent Application No. 2018-175009 dated Apr. 14, 2020.

* cited by examiner

STATOR HAVING AN INSULATING FILM FOR A COIL

CROSS-REFERENCE TO RELATED APPLICATION

Priority is claimed on Japanese Patent Application No. 2018-175009, filed Sep. 19, 2018, the content of which is incorporated herein by reference.

BACKGROUND OF THE INVENTION

Field of the Invention

The present invention relates to a stator and a method of manufacturing a stator.

Description of Related Art

In the related art, for a stator for a rotating electric machine, a configuration including a coil mounted on a stator core by inserting a conductor segment into slots formed in a stator core and joining conductor end portions protruding from the stator core to each other is known. In such a stator, after the conductor end portions are joined to each other, coating using a protective paint is performed in order to insulate the joining section.

For example, Japanese Unexamined Patent Application, First Publication No. 2003-260407 discloses a coil end protection coating method of dipping a coil tip portion heated in a furnace into a fluidized dipping vessel filled with a powder resin, and attaching the powder resin melted by fusing the powder resin to a coil welding section using heat of the coil.

SUMMARY OF THE INVENTION

Incidentally, in a rotating electric machine generally used at a high voltage, when a high voltage is applied to an electric wire (a coil), partial discharge easily occurs in the vicinity of an insulating film. Here, an insulating film having a decreased dielectric constant is used since a plurality of vacancies are provided in the insulating film as shown in FIG. 5.

However, when the powder coating disclosed in Unexamined Patent Application, First Publication No. 2003-260407 is performed on an insulating film with vacancies, paint easily enters concave sections in an insulating film surface formed by the vacancies. In this way, when the paint having a high dielectric constant enters the concave sections of the insulating film surface, the dielectric constant of the insulating film may be increased, and the insulation performance of the coil may be decreased. Accordingly, in the related art, it is required to provide a stator and a method of manufacturing a stator in which the insulation performance of an insulating film is improved.

An aspect of the present invention is directed to provide a stator and a method of manufacturing a stator in which insulation performance of an insulating film is improved.

(1) A stator according to an aspect of the present invention includes: a stator core; and a coil mounted on the stator core and having an insulating film, at least a part of the insulating film being coated with a protective paint, wherein the insulating film has vacancies, and the vacancies are formed by hollow capsules.

(2) In the aspect of the above-mentioned (1), the protective paint may include a powder, and an internal form of the vacancies may be smaller than an external form of the powder.

(3) A method of manufacturing a stator according to an aspect of the present invention includes: a coil mounting process of mounting a coil on a stator core, the coil having a conductor and an insulating film configured to cover the conductor and having a vacancy formed by a hollow capsule therein; and a coating process of applying a protective paint on the conductor and the insulating film of a coil end protruding from the stator core due to the coil mounting process to perform insulation processing on the coil end.

(4) In the aspect of the above-mentioned (3), the protective paint may have a powder, and an internal form of the vacancy may be smaller than an external form of the powder.

According to the aspect of the above-mentioned (1), since the insulating film has the vacancy having a lower dielectric constant than that of the material that forms the insulating film therein, the dielectric constant of the insulating film is decreased due to the vacancy.

Accordingly, when used as an insulating film of a coil used at a high voltage, occurrence of partial discharge in the insulating film can be minimized. Accordingly, insulation performance of the insulating film can be improved.

In addition, since the vacancy is formed by the hollow capsule, convex sections are formed when a plurality of capsules protrude from the surface of the insulating film. Accordingly, when the insulating film is coated with the protective paint, entry of the protective paint into the vacancies can be inhibited. Accordingly, in comparison with the case in which coating is performed on the insulating film with the vacancy having no capsules, a decrease in insulation performance due to an increase in dielectric constant of the insulating film, which is caused by the paint having a high dielectric constant entering the vacancy, can be minimized. Accordingly, when coating is performed on the insulating film with the vacancy, the insulation performance of the insulating film can be maintained.

Further, the concave sections are formed between the convex sections formed in the insulating film surface due to the capsules, and the adhesive property of the protective paint with respect to the insulating film is improved by an anchor effect in which the protective paint enters the concave section. Accordingly, peeling and raising of the protective paint with respect to the insulating film are minimized, and a decrease in insulation performance due to foreign substances being incorporated or a conductor being exposed can be minimized. Accordingly, an excellent insulating effect can be maintained due to the coating.

Accordingly, it is possible to provide a stator in which insulation performance of the insulating film is improved.

According to the aspect of the above-mentioned (2), since the protective paint has the powder and the internal form of the vacancy in the insulating film is smaller than the external form of the powder, for example, even when the capsules configured to cover the vacancy break due to an impact or the like, there is no possibility of the powder entering the vacancies. Accordingly, a decrease in insulation performance due to an increase in dielectric constant of the insulating film, which is caused by the paint having a higher dielectric constant than that of air entering the vacancy, can be minimized.

Accordingly, it is possible to provide the stator in which insulation performance of the insulating film is improved.

According to the aspect of the above-mentioned (3), the stator is manufactured by the coil mounting process of mounting the coil on the stator core, and the coating process of coating the coil end with the protective paint to perform insulation processing. Here, since the insulating film of the coil has the hollow capsule, the dielectric constant of the insulating film is decreased due to the vacancy. Accordingly, when used as an insulating film of a coil used at a high voltage, occurrence of partial discharge in the insulating film can be minimized.

In addition, since the convex sections are formed in the surface of the insulating film as a plurality of protruding capsules, when the insulating film is coated with the protective paint, entry of the protective paint into the vacancy can be inhibited. Accordingly, in comparison with the case in which coating is performed on the insulating film with the vacancy having no capsule, a decrease in insulation performance due to an increase in dielectric constant of the insulating film, which is caused by the paint having a high dielectric constant entering the vacancy, can be minimized. Accordingly, when coating is performed on the insulating film with the vacancy, insulation performance of the insulating film can be maintained.

Further, the concave section is formed between the convex sections formed in the insulating film surface due to the capsules, and the adhesive property of the protective paint with respect to the insulating film is improved by an anchor effect that the protective paint enters the concave section. Accordingly, peeling and raising of the protective paint with respect to the insulating film can be minimized, and a decrease in insulation performance due to foreign substance mixing or exposure of the conductor exposure can be minimized. Accordingly, an insulating effect due to the coating can be highly maintained.

Accordingly, it is possible to provide the method of manufacturing the stator in which insulation performance of the insulating film is improved.

According to the aspect of the above-mentioned (4), since the protective paint has the powder and the internal form of the vacancy in the insulating film is smaller than the external form of the powder, for example, even when the capsule configured to cover the vacancy is broken due to an impact or the like, there is no possibility that the powder enters the vacancy. Accordingly, a decrease in insulation performance due to an increase in dielectric constant of the insulating film, which is caused by the paint having a higher dielectric constant than that of air enters the vacancy, can be minimized. Accordingly, it is possible to provide the method of manufacturing the stator in which insulation performance of the insulating film is improved.

DETAILED DESCRIPTION OF THE INVENTION

Hereinafter, an embodiment of the present invention will be described with reference to the accompanying drawings.

Figure 1:
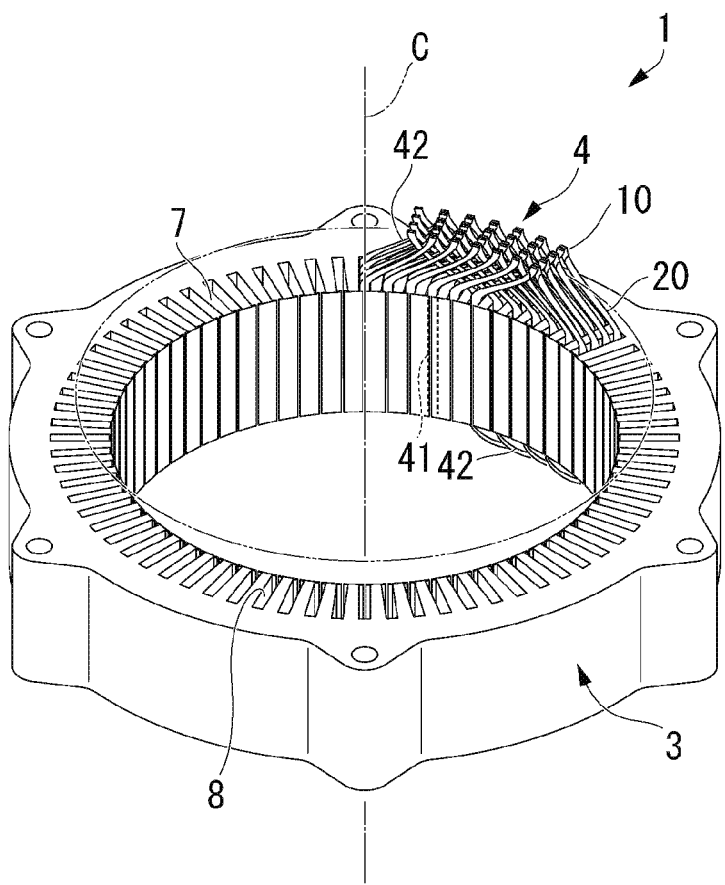
FIG. 1 is a perspective view of a stator according to a first embodiment.

FIG. 1 is a perspective view of appearance of a stator 1. The stator 1 includes a stator core 3 and a coil 4.

The stator core 3 is formed in an annular shape about an axis C. Teeth 7 are formed on an inner circumferential surface of the stator core 3. The teeth 7 protrude inward from the inner circumferential surface of the stator core 3 in the radial direction. A plurality of teeth 7 are provided in a circumferential direction. Slots 8 are formed between the teeth 7, and the coil 4, which will be described below, is inserted into the slots 8. A rotor (not shown) is pivotably disposed about the axis C in the stator core 3.

In the following description, a direction along the axis C of the stator core 3 may be referred to as an axial direction, a direction perpendicular to the axis C may be referred to as a radial direction, and a direction around the axis C may be referred to as a circumferential direction.

The coil 4 is mounted in the slots 8 of the stator core 3. Specifically, the coil 4 is fixed to the stator core 3 by inserting the coil 4 into the slots 8 from one side in the axial direction (a lower side in FIG. 1) while overlapping plural times in the radial direction and the circumferential direction, and joining tip portions of the coil 4 protruding from the slots 8 toward the other side in the axial direction (an upper side in FIG. 1). A portion of the coil 4 inserted into the slots 8 is a coil insertion section 41, and portions protruding from an end surface of the stator core 3 toward one side and the other side in the axial direction are coil ends 42.

Figure 2:
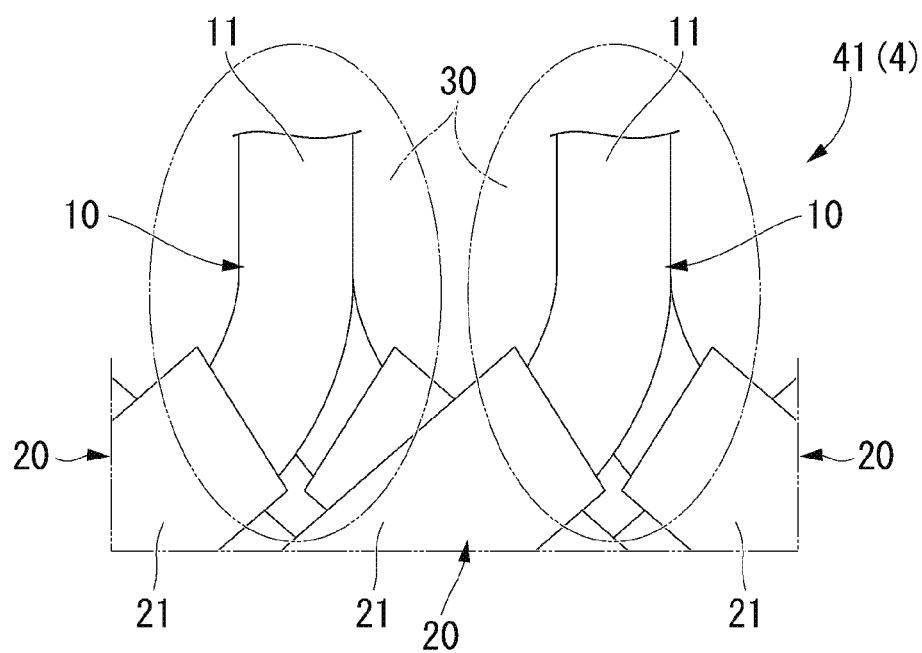
FIG. 2 is an enlarged view of a coil end according to the first embodiment.

The coil 4 has a conductor 10, an insulating film 20 and a protective paint 30 (see FIG. 2).

FIG. 2 is an enlarged view of the coil ends 42 protruding toward the other side in the axial direction.

The conductor 10 configures a core portion of the coil 4, and is formed in a linear shape having a rectangular cross section. The conductor 10 has welding sections 11 formed on tip portions of the coil ends 42 protruding toward the other side in the axial direction. The neighboring welding sections 11 are electrically and physically bonded to each other through welding.

Figure 3:
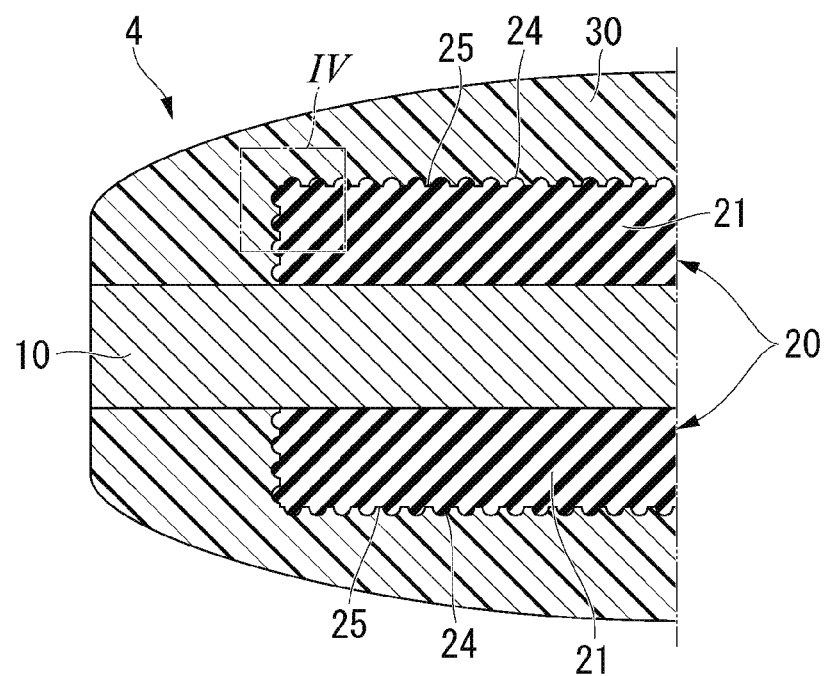
FIG. 3 is a cross-sectional view of a coil in the vicinity of a welding section according to the first embodiment.
Figure 4:
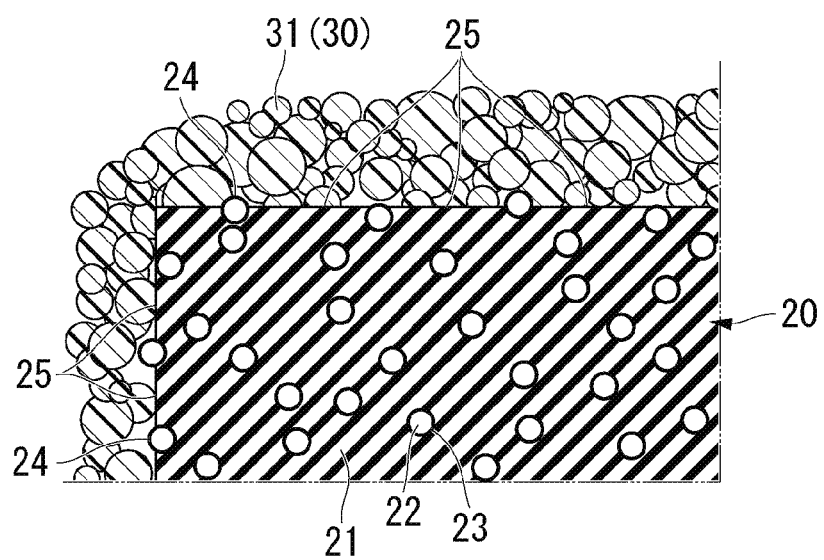
FIG. 4 is a cross-sectional view of a portion IV in FIG. 3.

FIG. 3 is a cross-sectional view of the coil 4 in the vicinity of the welding sections 11, and FIG. 4 is a cross-sectional view of a portion IV in FIG. 3.

The insulating film 20 covers an outer circumferential section of the conductor 10. The insulating film 20 is formed of an insulating material such as a resin or the like. The insulating film 20 is formed throughout the length of the conductor 10 except in the vicinity of the welding sections 11. In other words, the conductor 10 is exposed with respect to the insulating film 20 in the vicinity of the welding sections 11. A portion of the conductor 10 exposed from the insulating film 20 and at least a part of the insulating film 20 are coated with the protective paint 30.

The insulating film 20 has a film main body 21, a capsule 23 (see FIG. 4), convex sections 24 and concave sections 25.

The film main body 21 is formed of an insulating resin such as polyimide or the like.

As shown in FIG. 4, the film main body 21 has a plurality of hollow capsules 23 formed therein.

The capsules 23 are formed of a resin different from that of the film main body 21. The capsules 23 are formed of a resin such as a silicone or the like. The capsule 23 is formed in a spherical shape. The inside of the capsule 23 is a vacancy 22.

Among the capsules 23, portions at least some parts are exposed to the outside compared to an outer circumferential surface of the film main body 21 are referred as the convex sections 24. Portions between the convex sections 24 are referred as the concave sections 25. That is, the concave sections 25 are formed in a surface of the insulating film 20 by the capsules 23.

The conductor 10 exposed from the insulating film 20 and the insulating film 20 in the vicinity thereof are coated with the protective paint 30. The protective paint 30 enters the concave section 25. The protective paint 30 has a powder 31. Specifically, the coating by the protective paint 30 is so-called powder coating of attaching the powder 31 to a member to be painted (in the embodiment, the conductor 10 and the insulating film 20) and then heating the powder to form a protective film. An external form of the powder 31 is smaller than an internal form of the concave section 25, and larger than an external form of the capsule 23. In the embodiment, the powder 31 enters the concave section.

Here, provided that a dielectric constant of the film main body 21 is $\alpha$, a dielectric constant of the insulating film 20 having the vacancy 22 therein is $\beta$, a dielectric constant of air (the vacancy 22) is $\gamma$, and a dielectric constant of the protective paint 30 is $\varepsilon$, the relationship is $\varepsilon > \alpha > \beta > \gamma$. Accordingly, when the film main body 21 includes the vacancy 22 therein, the dielectric constant $\beta$ of the insulating film 20 is smaller than the dielectric constant $\alpha$ of the film main body 21.

A process of manufacturing the stator 1 has a coil mounting process of mounting the coil 4 on the stator core 3, and a coating process of performing insulation processing on a coil end.

In the coil mounting process, first, in a state in which the coil 4 formed in a U shape overlaps in the radial direction and the circumferential direction, the coil 4 is inserted into the slots 8 of the stator core 3 from one side in the axial direction. Next, the coil 4 is fixed to the stator core 3 by welding portions of the conductor 10 of the coil 4 protruding from the other side in the axial direction to each other.

In the coating process, the coil ends 42 of the coil 4 protruding toward the other side in the axial direction is coated with the protective paint 30 in the coil mounting process. More specifically, first, the powder 31 is sprayed to cover the exposed conductor 10 and the insulating film 20 in the vicinity of the conductor 10. After that, coating is completed by fixing the protective paint 30 to the conductor 10 and the insulating film 20 through baking. Further, the coating process also functions as insulating processing of the coil ends 42.

(Actions, Effects)

Next, actions and effects of the stator 1 will be described.

According to the stator 1 of the configuration, since the insulating film 20 has the vacancy 22 having a lower dielectric constant than that of a material that forms the insulating film 20 therein, the dielectric constant of the insulating film 20 is decreased by the vacancy 22. Accordingly, when used as the insulating film 20 of a coil used at a high voltage, occurrence of the partial discharge in the insulating film 20 can be minimized. Accordingly, insulation performance of the insulating film 20 can be improved.

Figure 5:
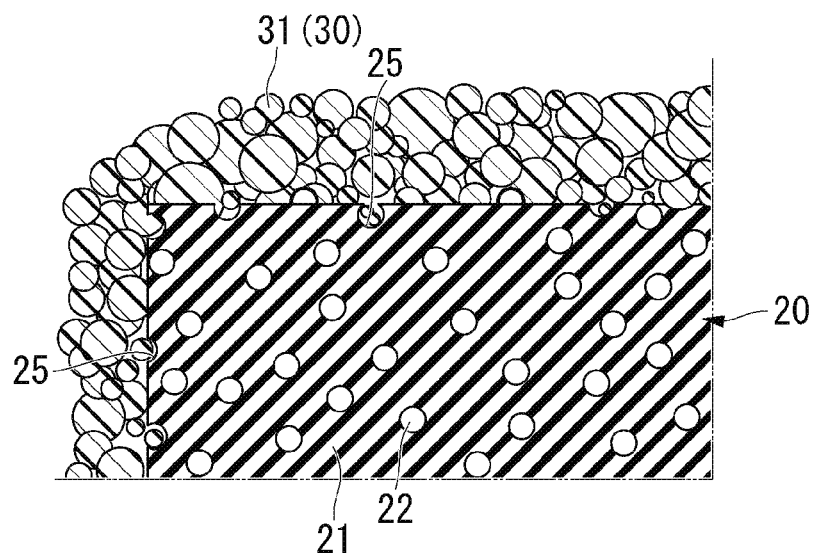
FIG. 5 is a cross-sectional view of a portion IV in FIG. 3 in the related art.

Here, when powder coating is performed on an insulating film with vacancies having no capsules 23 in the related art, as shown in FIG. 5, the protective paint 30 easily enters the concave sections 25 of the insulating film surface formed by the vacancy 22. Since the dielectric constant c of the protective paint 30 is larger than the dielectric constant $\beta$ of the insulating film 20, when the protective paint 30 enters the vacancy 22, the dielectric constant $\beta$ of the insulating film 20 may be increased, and the insulation performance may be decreased.

According to the configuration, since the vacancy 22 is formed by the hollow capsule 23, the convex sections 24 are formed in the surface of the insulating film 20 as the plurality of capsules 23 protrude. Accordingly, when the insulating film 20 is coated with the protective paint 30, entry of the protective paint 30 into the vacancies 22 can be inhibited. Accordingly, in comparison with the case in which coating is performed on the insulating film 20 with the vacancy 22 having no capsule 23, a decrease in insulation performance due to an increase in dielectric constant of the insulating film 20, which is caused by the protective paint 30 having a high dielectric constant entering the vacancy 22, can be minimized. Accordingly, when the coating is performed on the insulating film 20 with the vacancy 22, insulation performance of the insulating film 20 can be maintained.

Further, the concave sections 25 are formed between the convex sections 24 formed in the surface of the insulating film 20 due to the capsules 23, and an adhesive property of the protective paint 30 with respect to the insulating film 20 is improved by an anchor effect that the protective paint 30 enters the concave sections 25. Accordingly, peeling and raising of the protective paint 30 with respect to the insulating film 20 can be minimized, and a decrease in insulation performance due to foreign substance mixing or exposure of the conductor 10 can be minimized. Accordingly, an insulating effect due to the coating can be highly maintained.

Accordingly, it is possible to provide the stator 1 in which insulation performance of the insulating film 20 is improved.

In addition, since the protective paint 30 has the powder 31 and the internal form of the vacancy 22 in the insulating film 20 is smaller than the external form of the powder 31, for example, even when the capsule 23 configured to cover the vacancy 22 is broken due to an impact or the like, there is no possibility that the powder 31 enters the vacancy 22. Accordingly, the protective paint 30 having a higher dielectric constant than that of air enters the vacancy 22, and a decrease in insulation performance due to an increase in dielectric constant of the insulating film 20 can be minimized.

Accordingly, it is possible to provide the stator 1 in which insulation performance of the insulating film 20 is improved.

In addition, according to the method of manufacturing the stator 1 of the configuration, the stator 1 is manufactured by the coil mounting process of mounting the coil 4 on the stator core 3, and the coating process of coating the coil end 42 with the protective paint 30 to perform insulation processing. Here, since the insulating film 20 of the coil 4 has the hollow capsules 23, the dielectric constant of the insulating film 20 is decreased due to the vacancy 22. Accordingly, when used as the insulating film 20 of the coil 4 used at a high voltage, occurrence of partial discharge in the insulating film 20 can be minimized.

In addition, since the convex sections 24 are formed in the surface of the insulating film 20 as the plurality of capsules 23 protrude, when the insulating film 20 is coated with the protective paint 30, entry of the protective paint 30 into the vacancies 22 can be inhibited. Accordingly, in comparison with the case in which coating is performed on the insulating film 20 with the vacancy 22 having no capsule 23, a decrease in insulation performance due to an increase in dielectric constant of the insulating film 20, which is caused by the protective paint 30 having a high dielectric constant entering the vacancy 22, can be minimized. Accordingly, when coating is performed on the insulating film 20 with the vacancy 22, insulation performance of the insulating film 20 can be maintained.

Further, the concave sections 25 are formed between the convex sections 24 formed in the surface of the insulating film 20 due to the capsules 23, and the adhesive property of the protective paint 30 with respect to the insulating film 20 is improved by the anchor effect that the protective paint 30 enters the concave sections 25. Accordingly, peeling and raising of the protective paint 30 with respect to the insulating film 20 can be minimized, and a decrease in insulation performance due to foreign substance mixing or exposure of the conductor 10 can be minimized. Accordingly, an insulating effect due to the coating can be highly maintained.

Accordingly, it is possible to provide the method of manufacturing the stator 1 in which insulation performance of the insulating film 20 is improved.

In addition, since the protective paint 30 has the powder 31 and the internal form of the vacancy 22 in the insulating film 20 is smaller than the external form of the powder 31, for example, even when the capsule 23 configured to cover the vacancy 22 is broken due to an impact or the like, there is no possibility that the powder 31 enter the vacancy 22. Accordingly, the protective paint 30 having a higher dielectric constant than that of air enters the vacancy 22, and a decrease in insulation performance due to an increase in dielectric constant of the insulating film 20 can be minimized.

Accordingly, it is possible to provide the method of manufacturing the stator 1 in which insulation performance of the insulating film 20 is improved.

Further, the technical range of the present invention is not limited to the embodiment and various modifications may be made without departing from the scope of the present invention.

For example, a material of the film main body 21 may be an insulating resin other than polyimide.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A stator comprising:
    a stator core; and
    a coil mounted on the stator core and having an insulating film, at least a part of the insulating film being coated with a protective paint,
    wherein the insulating film has vacancies therein,
    the vacancies are formed by hollow capsules,
    the protective paint has a powder,
    an internal form of the vacancies is smaller than an external form of the powder, and
    at least a portion of the capsules are exposed at a surface of the insulating film.

2. The stator according to claim 1, wherein at least a part of at least one capsule is exposed at an outer circumferential surface of the insulating film.

3. A method of manufacturing a stator, comprising:
    a coil mounting process of mounting a coil on a stator core, the coil having a conductor and an insulating film configured to cover the conductor and having a vacancy formed by a hollow capsule therein; and
    a coating process of applying a protective paint on the conductor and the insulating film of a coil end protruding from the stator core due to the coil mounting process to perform insulation processing on the coil end,
    wherein the protective paint has a powder, and
    an internal form of the vacancy is smaller than an external form of the powder.

* * * * *